Patented Oct. 25, 1932

1,884,632

UNITED STATES PATENT OFFICE

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA

FINISH REMOVER COMPOSITION ADAPTED TO REMOVE NITROCELLULOSE COATINGS

No Drawing.   Application filed September 1, 1927. Serial No. 217,014.

This invention relates to the paint and varnish remover art, and relates particularly to a removing composition adapted to soften coatings of the lacquer type containing nitrocellulose, dissolving or converting such coatings into a condition such that they may be readily removed from the wood, metal or other surface by means of putty knife, wire brush, or other similar means.

The remover compositions falling within the range of the present invention are those which contain a substantial amount of a nitrocellulose solvent or softening agent, or mixtures of solvents cooperating to serve as a softening agent and specifically, in the preferred form, the composition contains a wax, preferably a mineral wax, such as paraffin or ceresine, the wax being present preferably in minimum or optimum amount requisite for film formation at maximum room temperature under service conditions, the solvent mixture or vehicle preferably being composed of a wax solvent of relatively high volatility, preferably being at least equal to the volatility of the specific nitrocellulose softening agent, the latter commonly serving as a wax precipitant and wax conditioner.

An important consideration in connection with the production of an effective remover for lacquers, is the employment of the minimum or optimum amount of wax sufficing to adequately retard evaporation. Lacquers are very sensitive to the effect of wax, and if a wax-containing remover is employed to soften the old coat and the cleansing of the surface is not properly conducted, traces of wax may cause blemishes in the subsequent lacquer coat. It should be remembered that coats of lacquer are thin in comparison to oil varnishes, and therefore wax may penetrate several coats of lacquer, and cause blemishes at the surface. Wax also prevents lacquers from drying quickly. Hence it is important not to leave any wax, or at least any substantial quantities of wax on the surface to which lacquer is to be applied.

For each mixture of volatile remover solvents there exists a definite content of wax necessary to prevent evaporation at a given temperature. The solvent action of the remover liquids on the wax increases rapidly with the temperature, hence a change of only a few degrees may put the wax so completely into solution that a wax film will not be formed quickly on exposure. A coating of remover containing an inadequate percentage of wax will throw off vapors of the solvents very rapidly until a concentration of the wax is reached which allows the formation of a film. At this point the evaporation may be checked.

Thus a remover may be prepared with a wax content sufficient for use at 70° F., but which if used at 90° F. will so sluggishly form a film that a considerable proportion, perhaps one-fourth to one-half of the total solvent mixture, may escape before the critical concentration for giving a good film formation is reached.

In other cases the solvents may be such that at no time, especially at higher temperatures, is good retardation of evaporation secured, except possibly during the last ineffectual stages of drying out, this condition being due to the employment of a wax solvent which normally evaporates more slowly than the wax precipitant.

For example, if acetone or methyl alcohol, both highly volatile wax precipitants, are used in conjunction with solvent naphtha, which has a much higher boiling point and is slower of evaporation at the same temperature (than the acetone or methyl alcohol), even though the wax is seemingly well proportioned in accordance with the teachings of the prior art, there always exists the possibility that the initial escape of the acetone or methyl alcohol will so increase the proportion of the heavier wax solvent that the wax will not yield a film, at least for a considerable proportion of the period of exposure, and thereby a considerable loss of the specific solvents having a softening action on the lacquer coating will result.

A very rough method of testing a remover to determine the relative rate of evaporation of different compositions consists in dipping the bulb of a chemical thermometer into the remover and exposing the bulb to the air while rotating the thermometer slowly, thus forming a coating of the remover over the bulb. A sudden drop indicative of rapid chilling gives an indication of the rate of evaporation. A remover containing an adequate proportion of wax allows very little drop in temperature, the mercury column usually slowly returning to approximately room temperature.

There is desired a remover composition which will contain wax in minimum quantity effective in forming films over the usual range of room temperature under working conditions. Ordinarily the maximum temperature at which lacquer remover is used is 90° F. Enough wax (but substantially no excess, preferably) is employed in such a remover to form a film at this temperature and of course at lower temperatures. In other cases under severe service conditions additional wax may be required to permit films to form at temperatures higher than 90° F. As a lacquer remover there is needed a strong solvent for nitrocellulose. The customary solvents used in making lacquers, such for example as amyl acetate, butyl acetate, amyl alcohol, butyl alcohol, ethyl lactate, monoethyl ether of ethylene glycol and the like are comparatively slowly acting solvents from the lacquer removing standpoint. On the other hand the highly volatile nitrocellulose solvents such as acetone, methyl acetate, methyl acetone, and the like act upon a lacquer surface with a rapidity which compared with the heavier solvents is astonishing. Therefore I prefer to employ low-boiling nitrocellulose solvents, as that part of the remover vehicle which is called upon to exert a profound softening action on the lacquer coating. On the other hand it is desirable not to use solvents of too low boiling point and extremely high volatility because of the increase in the fire hazard. Preferably I employ softening solvents having boiling points ranging from 50° C. to about 100° C. (Room temperatures are referred to herein in terms of Fahrenheit, the centigrade scale being used in referring to matters chemical.)

Within this range there are included in addition to the preferred solvents, acetone, methyl acetate, methyl acetate, and several other low boiling highly volatile agents, the several nitrocellulose solvents of higher boiling point, such as ethyl acetate, isopropyl acetate, methyl ethyl ketone, ethyl formate, etc. Such distinctly nitrocellulose solvents work very effectively in conjunction with alcohols, in fact the addition of alcohol to a nitrocellulose solution usually tending to reduce viscosity. Any reduction in viscosity which can be secured in dissolving or softening a lacquer coating is desirable, since it aids penetration and permits of greater mobility of solvent action. Hence I prefer to have present one or more of the lower boiling alcohols such as methyl alcohol, ethyl alcohol in the various forms of denatured alcohol, propyl alcohol, isopropyl alcohol, and the like. The proportion of alcoholic non-solvent to actual nitrocellulose solvent may be varied within wide limits depending upon the character of coatings which are to be specifically treated. In most cases I prefer to employ proportions which are adapted for general use.

Ordinarily I prefer to have present a positive wax solvent, that is one which dissolves wax readily, this class of bodies including the volatile hydrocarbons such as benzol and petroleum spirits boiling at about 50 to 100° C., more or less. Too great a portion of the hydrocarbon wax solvent would render the composition slow in its action on nitrocellulose coats, because the hydrocarbon is particularly a nonsolvent for most grades of nitrocellulose. Furthermore, a high proportion of the hydrocarbon would call for an increased content of wax, and this, as indicated above, is undesirable. As the hydrocarbon is increased in proportion, the wax precipitant is correspondingly decreased, and more wax is required in a state of quasi solution or colloidal dispersion to form an effective film. Since one object of the present invention is to reduce the content of wax to a minimum amount effective at the maximum temperatures of usage, the hydrocarbon content preferably is less than that of the remaining solvent material, whether this be of nitrocellulose solvent such as acetone or a mixture of nitrocellulose solvent and alcoholic mild non-solvent. Furthermore, in the preferred embodiment it is desirable not to employ more than 20 to 30% of hydrocarbon solvent. Using this minor proportion of wax solvent enables a considerably less proportion of wax to be used than would be the case if wax solvent and wax precipitant are used in approximately equal proportions, which is a prevailing practice.

Carbon bisulphide is a powerful wax solvent, and is highly volatile, hence tends to leave the remover coating more quickly than the generally available wax precipitants, and in doing so chills the surface, causing the wax film to form the more quickly by the freezing effect. Although desirable as a freezer, carbon bisulphide is objectionable for hygienic reasons and because of fire hazard, and therefore preferably is not employed in a composition intended for general uses. Where a remover is to be used in the open air, as for example in taking the lacquer coating off an automobile in the open air, carbon bisulphide may be used wholly as the wax solvent, or it may be used in admixture with benzol or petroleum spirit, in order to get the active freezing and film forming effect of the bisulphide.

Benzol is not as powerful a wax solvent, but is an effective cooperating solvent in a lacquer remover. If not used in too large proportion nitrocellulose coatings are readily attacked by compositions containing benzol. In some cases however its employment is objected to for hygienic reasons, and because of this I have set forth in the preferred form of the invention a composition containing petroleum spirit, which I have found is highly effective for the purpose. Benzol is somewhat slower in evaporation than acetone, methyl acetate and the like, and on exposure there exists the possibility that the bezol will increase in concentration before a film can be formed, and thus a solvent effect on the wax is exerted which is prejudicial to film formation at temperatures approaching the critical temperature.

On the other hand petroleum spirit may be obtained which is highly volatile, and which evaporates more rapidly than acetone and the like, so that during the first instant of the exposure of the remover the wax solvent departs more rapidly, thus increasing the concentration of the wax precipitant at the surface, and causing immediate formation of a waxy film, which action is facilitated by the freezing effect due to the evaporation of the highly volatile petroleum spirit.

Even though the wax be in a precipitated condition it does not follow that such precipitated wax is available to form a film. Certain remover vehicles do not properly hold the wax in an effective condition, even though there may be apparently a sufficient amount of wax solvent. Due to variations in temperature, especially during the winter, the wax may be precipitated and crystallized or granulated (before application of the remover) into a form which does not readily dissolve as the temperature is increased by changes in atmospheric conditions. The wax should be maintained in a state in which it will always be available for substantially instantaneous formation of a retarding film on exposure. To obtain this responsiveness on the part of the wax, a wax precipitant of a special character is desirable. Certain of the wax precipitants such as methyl or ethyl alcohol in their commercial forms containing say 5% of water, are extremely powerful precipitants, and do not tend to condition the wax in the most effectual manner. On the other hand anhydrous solvents such as anhydrous acetone, and the like, have a better conditioning effect. A more satisfactory effect in conditioning the wax is obtained by the employment of a variable amount of an ester such as methyl acetate or ethyl acetate. Other esters of the lower alcohols and lower fatty acids likewise may be used. These acetates and esters generally speaking have a slight solvent action on the wax, but so small in comparison with hydrocarbon solvents, that they would not generally be regarded as solvents for wax. When these esters are included in a composition containing a hydrocarbon wax solvent, they are, by virtue of their mild effect on the wax, included with the wax precipitants. If a high proportion of wax is present they are in fact actual precipitants, but if, as is the case in the present invention, the aforesaid minimum content of wax obtains, such esters exert a conditioning effect which renders the wax in a better film forming condition than is the case when the wax precipitant is of the very powerful type represented by slightly aqueous alcohol. Since these "wax conditioning agents" are generally powerful solvents for nitrocellulose they serve most effectively in obtaining a preferred form of lacquer remover in accordance with the present invention. The term "wax conditioning ester" is used herein to cover nitrocellulose solvents which exert the conditioning effect referred to in this paragraph.

Since the solubility of the wax in the solvent whole vehicle of the remover depends on temperature, composition of whole solvents, and on the nature of the wax itself, the following simple procedure may be adopted to determine the approximate amount of wax to employ under given conditions. The composition of the solvents having been determined, and the maximum working temperature under which the remover is to be applied having been ascertained, an excess of the wax is dissolved in the solvent mixture at a temperature capable of accomplishing such solution, then the composition is digested at the maximum temperature of operation, as for example by maintaining in a thermostat at that temperature over a period of several hours or longer, until wax ceases to be deposited. The solution then is filtered and the content of wax in solution is approximately the optimum amount for that temperature. Likewise it will serve for use at all reasonable working temperatures below this critical temperature, since there will always be an excess of wax as the solution cools below the critical temperature.

I prefer to use paraffin wax in carrying out the present invention, and I have noted that the various grades of paraffin wax having different melting points such as are commonly found on the market vary to some extent in their solubility and film forming properties. Solvents likewise vary in their quality, and it is difficult to always obtain the same grade of wax and solvents. The test given above eliminates the factor of variability of the raw materials, and enables an optimum wax content to be rapidly obtained. In other words, having by the above test, found the amount of wax required for optimum conditions at the critical temperature, a commercial batch of the remover is prepared from the same solvents and the same wax, using the latter in just the amount required to furnish the optimum content; or in some cases slightly increasing the percentage of wax possibly 10 to 20% more than is required as the optimum content, in order to have this very slight excess as a factor of safety. However, I do not wish to limit the composition of the present invention too definitely to this amount of wax as the factor of safety may change due to some particular requirement or condition.

In some cases a protective colloid, such as nitrocellulose, cellulose acetate and the like, and especially nitrocellulose of high viscosity, may be employed. The nitrocellulose serves to maintain the wax in better dispersion, especially at low temperatures or under conditions where the wax solvent is reduced to a minimum.

Another modification of the invention contemplates the employment with the wax of sodium or potassium oleate, stearate, palmitate and the like. These may be formed in the composition, or may be added preferably in the dry state and dissolved by heating. Conveniently they may be formed in the composition by dissolving the higher fatty acid in one of the solvents, as for example the hydrocarbon, when the latter is used; and dissolving potassium or sodium hydroxide in equivalent amount in, for example, ethyl alcohol. The wax may likewise be dissolved in the benzol solution and on mixing the several constituents of the remover, combination takes place between the hydroxide and fatty acid, and a protective colloid action on the wax is thus secured. When such alkali compounds of the higher fatty acids are used in a proportion at least equal to that of the wax, or in amounts two or three times greater than the amount of the wax, there appears to be less tendency for any traces of the wax to adhere to the cleaned surface after the remover has been used.

In addition to the hydrocarbons mentioned above I also may use as wax solvents, various chlorinated compounds such as carbon tetrachloride, trichlorethylene, tetrachlorethane, dichlorethylene and the like. The latter is preferred, owing to its ready volatility and because it is not as readily ignited as non-chlorinated solvents of equal volatility. Dichlorethylene or ethylene dichloride does not form hydrochloric acid in the presence of water very readily, whereas carbon tetrachloride does become acid in the presence of moisture. The dichlorethylene is an excellent wax solvent and effective as a freezer. The most desirable form of remover is one that does not permit more than 3 to 5% of the solvent to escape before a wax film or blanket forms. Conditions approaching this ideal one are more readily obtained as indicated by the employment of a highly volatile wax solvent, having a volatility at least equal to that of the wax precipitant. It is not necessary, however, to have all of the wax solvent of this highly volatile character, one-fourth to one-half of the total wax solvent advantageously in some cases being less volatile.

While I have referred above to the relatively poor solvent action from the remover standpoint of heavy or high boiling solvents ordinarily employed as vehicles in nitrocellulose lacquers, I wish it understood that I am not precluded from using such high boiling solvents, to some extent at least, especially in cases where the remover after being applied to the lacquer surface, is allowed to stand over-night, or for 24 hours or more before the softened material is scraped or washed off. In such cases I may add 10 to 20% or so of high boiling solvents, such as ethyl lactate, the mono ethyl ether of ethylene glycol, the mono methyl or ethyl ether of diethylene glycol, the acetates of these ethers, amyl acetate, butyl acetate, amyl alcohol, butyl alcohol, ethyl oxy-butyrate, and the like.

*Example I*

A critical-temperature lacquer remover comprising methyl alcohol and free from benzol was made as follows:

Acetone _____ 30 parts by volume
Ethyl acetate_____ 25 parts by volume
Methyl alcohol_____ 25 parts by volume
Petroleum ether (B. P.
  40–60° C.)_____ 20 parts by volume
Paraffin wax_____ 0.6% by weight The wax was dissolved in the petroleum ether and this solution was mixed with the other solvents. The composition had a specific gravity of 0.785 at 20° C. It was prepared at a critical temperature of 80–81° F. (27° C.) and was filtered at this temperature. The clear critical-temperature lacquer remover thus obtained contained 0.48% wax by weight, the excess 0.12% of wax having been removed by the filtration.

The thermometer test showed good retardation of evaporation and the film forming properties were good, the film when broken repairing readily.

Five grams of this critical-temperature lacquer remover were placed in a dish 50 mm. in diameter, 10 mm. high, and exposed to a room temperature of 80° F. or nearly that temperature over a period of several hours. The loss in weight at the end of 2 hours was 0.05 grams, or 1%. At the end of 4 hours the loss was 0.16 grams, or approximately 3%.

A quantity of this critical-temperature lacquer remover was placed in an ice-box overnight and the next morning exhibited a considerable precipitate of wax. This, however, dissolved when the remover stood for a time at room temperature. The precipitate did not appear to be granular and the wax evidently was in a well-conditioned state.

Example II

A critical-temperature lacquer remover prepared at a somewhat lower temperature was made without benzol, using acetone alone as the effective nitrocellulose solvent. The composition was made as follows:

| | |
|---|---|
| Acetone | 80 parts by volume |
| Petroleum ether (as above) | 20 parts by volume |
| Paraffin wax | 0.6% by weight |

This composition was filtered at 72° F. (22.2° C.).

Example III

The following composition was made with ceresine wax:

| | |
|---|---|
| Acetone | 30 parts by volume |
| Ethyl acetate | 25 parts by volume |
| Methyl alcohol | 25 parts by volume |
| Petroleum ether | 20 parts by volume |
| Ceresine wax | 0.6% by weight |

The wax used had a melting point of 59-60° C.

The critical temperature was selected at 86° F. (30° C.) and filtration was carried out at that temperature. The decanted or filtered solution, clear at the critical temperature, gave a considerable precipitate of well-conditioned wax, when chilled in an ice-box for 4 hours.

Example IV

| | |
|---|---|
| Acetone | 40 parts by volume |
| Ethyl acetate | 30 parts by volume |
| Methyl alcohol | 10 parts by volume |
| Petroleum ether | 20 parts by volume |
| Paraffin wax | 0.6% by weight |
| Nitrocellulose | 0.25% by weight |

As in the foregoing examples, the petroleum ether was a straight run gasoline product or casing head naphtha of high volatility. The nitrocellulose was employed as a wax-protective colloid.

A critical temperature of 79° F. (26° C.) having been determined upon, the composition was prepared and filtered at this same critical temperature, yielding a clear solution. It should be noted that a critical-temperature lacquer remover having a content of wax, optimum with respect to that critical temperature, tends to deposit a wax as soon as the temperature falls below the critical point. This action is retarded somewhat by the protective effect of the nitrocellulose. However, by increasing the viscosity of the solution, and thereby impairing the mobility of the solvents, the action of this remover was not quite as rapid (on the lacquer coat) as when the nitrocellulose was omitted.

Example V

The solvent composition used was the same as in Example I, but the critical temperature was 86° F. (30° C.). The paraffin wax used had a melting point of 52-53° C.

Example VI

| | |
|---|---|
| Acetone | 30 parts by volume |
| Esters | 25 parts by volume |
| Alcohols | 25 parts by volume |
| Casing head naphtha | 20 parts by volume |
| Paraffin wax | 1.2% by weight |

This was digested at 91° F. (33° C.) and was filtered on a filter bath maintained at that temperature. The amount of wax determined in the resulting critical temperature remover was 0.95%.

Example VII

| | |
|---|---|
| Acetone | 30 parts by volume |
| Ethyl acetate | 25 parts by volume |
| Denatured alcohol | 25 parts by volume |
| Dichlorethylene | 20 parts by volume |
| Paraffin wax | 1.2% by weight |

This was made at a critical temperature of 91° F. (33° C.) and contained approximately 1% of wax in solution.

Example VIII

| | |
|---|---|
| Acetone | 25 parts by volume |
| Denatured alcohol | 50 parts by volume |
| Dichlorethylene | 25 parts by volume |
| Paraffin wax | 1.5% by weight |

The critical temperature employed in making this remover was 95° F. (35° C.) and the wax actually in solution after filtration was found to be 1.3% by weight.

Example IX

| | |
|---|---|
| Acetone | 30 parts by volume |
| Ethyl acetate | 25 parts by volume |
| Methyl alcohol | 25 parts by volume |
| Casing head naphtha | 20 parts by volume |
| Ceresine wax | 0.6% by weight |

The wax may be put into solution in various ways, one being that indicated above, namely dissolving the wax in the wax solvent and adding it to the other solvents, or adding the other solvents to such solution. Another method is to digest the wax in the mixed solvents at the critical temperature.

In the foregoing I have employed filtration to eliminate excess wax at the critical temperature, but it should be understood that in commercial manufacture the proportion of wax of given quality, having been decided in this way with the actual solvent mixture employed, furnishes the data requisite for actual manufacture, which may or may not include a filtration or decantation step. Once the critical proportion of wax is determined, this optimum amount may be directly incorporated with the other components of the remover and the filtration step avoided.

What I claim is:

1. A critical-temperature lacquer remover comprising lacquer solvents constituting by far the largest part of the entire remover, wax and an alkali compound of higher fatty acids as a protective colloid, and a wax solvent constituting not substantially over 20% of the entire remover.

2. A critical-temperature lacquer remover having a content of wax only sufficient to prevent excessive evaporation at the temperature at which such remover is to be employed, such remover containing lacquer solvents in preponderating excess over all other constituents.

3. A lacquer remover containing wax in amount not substantially over 1.5%, wax solvent and wax precipitant, the wax-precipitant being several times more than the wax solvent, and containing approximately a minimum amount of wax to form a stable evaporation-retarding film at a predetermined maximum temperature at which the remover is to be employed.

4. A lacquer remover containing wax in amount not substantially over 1.5%, wax solvent and wax precipitant, the wax-precipitant being about four times more than the wax solvent, and containing approximately a minimum amount of wax to form a stable evaporation-retarding film at a predetermined maximum temperature at which the remover is to be employed.

5. A remover adapted for removing lacquer coatings comprising a wax, in total amount not substantially over 1.5%, an aliphatic wax solvent which constitutes only much less than half of the liquids present in the remover, and wax precipitants selected from the group consisting of acetone, methyl-acetone, methyl-acetate, ethyl-acetate, isopropyl-acetate, methyl-ethyl-ketone, ethyl formate, ethyl alcohol, propyl alcohol, isopropyl alcohol, which remover is capable of removing dried coats of lacquer without leaving substantial amounts of wax on the surface.

6. A critical temperature lacquer remover comprising lacquer solvents constituting by far the major part of the entire composition, a minor proportion of petroleum hydrocarbon substantially all boiling at not considerably above 60° C., constituting the essential wax solvent, a mineral wax, and a wax-protective colloid.

7. A critical temperature lacquer remover comprising lacquer solvents constituting by far the major part of the entire composition, a minor proportion of petroleum hydrocarbon substantially all boiling at not considerably above 60° C., constituting the essential wax solvent, a mineral wax and high viscosity nitro-cellulose.

8. A low-wax lacquer remover containing not substantially over 1.5% of wax, in a vehicle containing a wax solvent and wax precipitants, which latter are at least largely nitrocellulose solvents and which are present in amount several times greater than said wax solvent.

CARLETON ELLIS.